US010863580B1

(12) United States Patent
Baldassarre et al.

(10) Patent No.: US 10,863,580 B1
(45) Date of Patent: Dec. 8, 2020

(54) CONTINUOUS SHORT RANGE WIRELESS COMMUNICATION DETECTION FOR USER DEVICES USING A BACKGROUND APPLICATION

(71) Applicant: Accenture Global Solutions Limited, Dublin (IE)

(72) Inventors: Emanuele Baldassarre, Bari (IT); Lucio Maria De Marco, Rome (IT); Gabriele Del Greco, Rome (IT); Simone Valente, Cisterna di Latina (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/983,482

(22) Filed: Aug. 3, 2020

Related U.S. Application Data

(60) Provisional application No. 63/024,843, filed on May 14, 2020.

(51) Int. Cl.
| | |
|---|---|
| *H04W 80/10* | (2009.01) |
| *H04W 4/80* | (2018.01) |
| *G06F 3/16* | (2006.01) |
| *H04W 76/11* | (2018.01) |
| *G06F 9/48* | (2006.01) |
| *H04W 8/00* | (2009.01) |

(52) U.S. Cl.
CPC .......... *H04W 80/10* (2013.01); *G06F 3/165* (2013.01); *G06F 9/485* (2013.01); *H04W 4/80* (2018.02); *H04W 8/005* (2013.01); *H04W 76/11* (2018.02)

(58) Field of Classification Search
CPC ..................................................... H04W 80/10
See application file for complete search history.

(56) References Cited

U.S. PATENT DOCUMENTS

| | | | | | |
|---|---|---|---|---|---|
| 2008/0279137 | A1* | 11/2008 | Pernu | ................... | H04W 88/06 370/328 |
| 2013/0336311 | A1* | 12/2013 | Laasik | ............... | H04L 65/1069 370/352 |
| 2014/0136681 | A1* | 5/2014 | Greenlee | ................. | H04L 67/14 709/224 |
| 2019/0391262 | A1* | 12/2019 | Summers | .............. | H04W 4/023 |

* cited by examiner

*Primary Examiner* — Hsinchun Liao
(74) *Attorney, Agent, or Firm* — Harrity & Harrity, LLP

(57) ABSTRACT

A user device may receive, an output stream associated with an application session, wherein the output stream is associated with imperceptible content via an output component. The user device may transmit, via a short range wireless communication component, an advertisement associated with the application session. The user device may configure a main processing thread that is associated with executing the application session to provide the output stream to the output component. The main processing thread may be configured to provide the output stream to: cause the output component to operate in association with the imperceptible content and prevent an operating system from suspending the application session while the application session is executing in a background state.

20 Claims, 8 Drawing Sheets

CONTINUOUS SHORT RANGE WIRELESS COMMUNICATION DETECTION FOR USER DEVICES USING A BACKGROUND APPLICATION

CROSS-REFERENCE TO RELATED APPLICATION

This Patent Application claims priority to U.S. Provisional Patent Application No. 63/024,843, filed on May 14, 2020, and entitled "BLUETOOTH CONTINUOUS BACKGROUND DISCOVERY FOR MOBILE DEVICES." The disclosure of the prior Application is considered part of and is incorporated by reference into this Patent Application.

BACKGROUND

Short range wireless communication enables wireless communication over relatively short distances (e.g., within 30 meters). For example, BLUETOOTH® is a wireless technology standard for exchanging data over short distances using short-wavelength ultra-high frequency (UHF) radio waves from 2.4 gigahertz (GHz) to 2.485 GHz. BLUETOOTH® Low Energy (BLE) is a form of BLUETOOTH® communication that allows for communication with devices running on low power. Such devices may be configured to transmit advertisements to permit one or more other short range wireless communication devices to detect the devices and/or to initiate or establish short range wireless communication connections with the one or more other short range wireless communication devices.

SUMMARY

In some implementations, a device includes one or more memories; and one or more processors, communicatively coupled to the one or more memories, configured to: initiate an application session associated with an application; activate a continuous discovery mode associated with permitting discovery of the device during the application session, wherein the continuous discovery mode is to cause a short range wireless communication component of the device to repeatedly transmit an advertisement; obtain, based on the continuous discovery mode being activated, an output stream associated with the application session; control an output component according to the output stream; detect a background event associated with executing the application session in a background state; execute, based on the background event, the application session in the background state; and prevent, based on controlling the output component according to the output stream, an operating system of the device from suspending the application session in the background state until the continuous discovery mode is deactivated.

In some implementations, a method includes transmitting an advertisement associated with a short range wireless communication protocol, wherein the advertisement is transmitted in association with a continuous discovery mode of an application session; detecting a background event associated with the application session; executing the application session in a background state based on detecting the background event; processing an output stream associated with the application session, wherein the output stream is associated with executing the application session in the continuous discovery mode; and controlling an output component in association with providing muted audio content associated with the output stream while the application session is executing in the background state, wherein the muted audio content is provided to prevent an operating system of the device from suspending the application session a threshold time period after the background event to permit continued transmission of the advertisement in association with the continuous discovery mode.

In some implementations, a non-transitory computer-readable medium storing instructions includes one or more instructions that, when executed by one or more processors, cause the one or more processors to: receive, an output stream associated with an application session, wherein the output stream is associated with imperceptible content via an output component; transmit, via a short range wireless communication component, an advertisement associated with the application session; and configure a main processing thread that is associated with executing the application session to provide the output stream to the output component, wherein the main processing thread is configured to provide the output stream to: cause the output component to operate in association with the imperceptible content, and prevent an operating system from suspending the application session while the application session is executing in a background state.

DETAILED DESCRIPTION

Figure 1A:
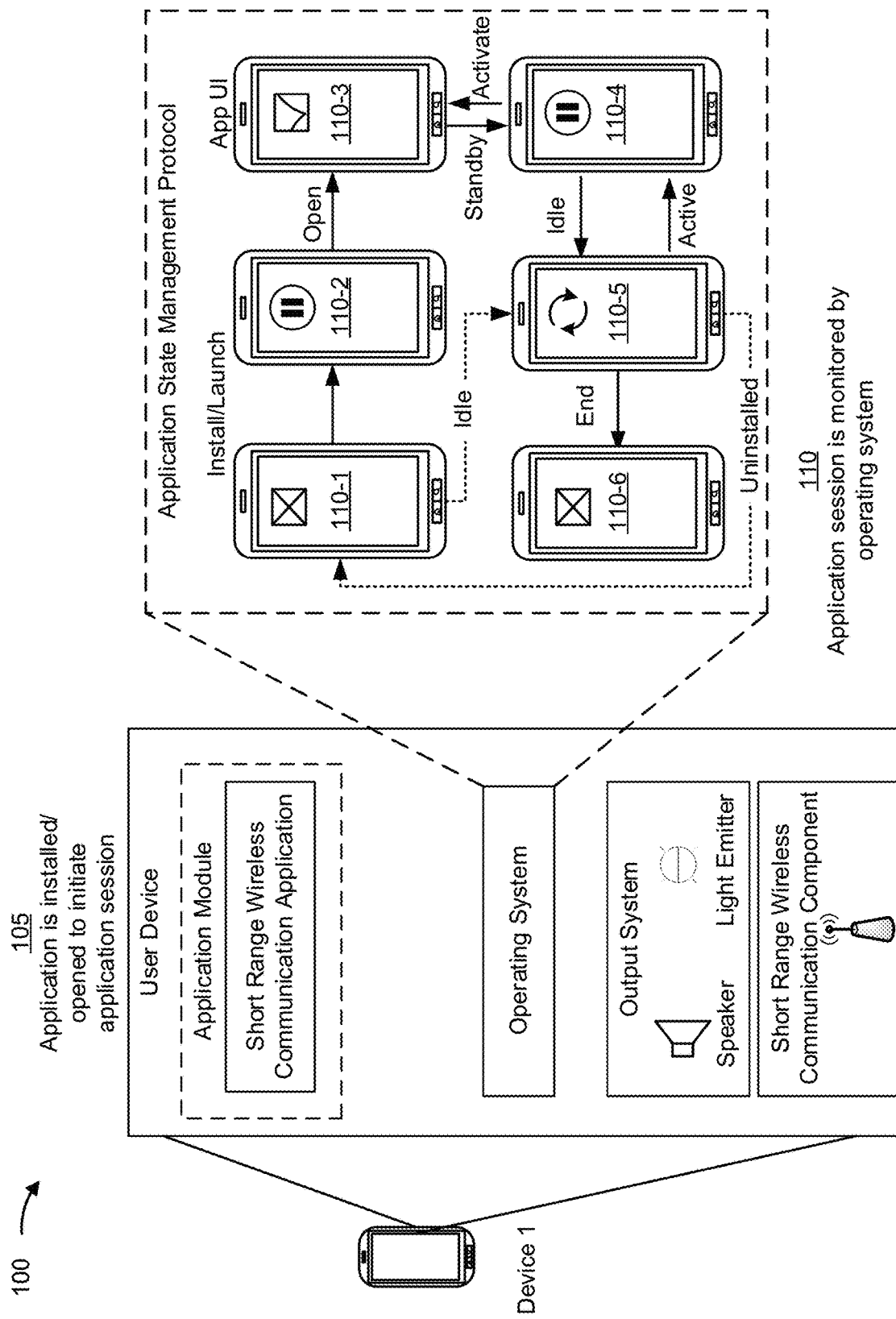
FIGS. 1A-1D are diagrams of an example implementation described herein.

The following detailed description of example implementations refers to the accompanying drawings. The same reference numbers in different drawings may identify the same or similar elements.

On a client device, such as a mobile device (e.g., a smart phone, a tablet, a device in a vehicle, a location detection device, and/or the like), an application may need to scan for short range wireless communication (BLUETOOTH®, BLUETOOTH® Low Energy (BLE, or other wireless personal area network (WPAN)) devices. For example, the application may need use short range wireless communication to detect whether one or more other devices are within a particular distance of the client device. In such cases, the application may cause the client device to transmit (e.g., repeatedly) an advertisement to broadcast the presence of the client device and/or permit the other devices to detect the presence of the client device. However, when such an application is executing in the background (e.g., not in the foreground and/or not being displayed), a short range wireless communication scan may be disabled by an operating system of the client device, thereby preventing the client device from transmitting the advertisement while the application is in the background. This can result in unreliable behavior with respect to short range wireless communication and/or execution of the application. Some implementations described herein overcome these and other issues, therefore enabling a reliable short range wireless communication scan and improving application performance.

In some implementations, a system and/or method may communicate data from a first mobile device to a second mobile device. The first mobile device and/or the second mobile device may run or execute an application. The application may communicate data (e.g., between devices) using a short range wireless communication protocol. The application may have a configuration setting associated with controlling an output component that is managed by a particular operating system (e.g., iOS) (e.g., via a driver of the output component). For example, the application may be configured to provide an output stream associated imperceptible content to the output component to cause the output component to correspondingly output the imperceptible content that is configured to be undetectable to a user. Such imperceptible content may include muted audio content, unidentifiable light content, and/or the like.

In some implementations, when an audio player application is activated, the output stream with the imperceptible content may be mixed with an output stream of the audio player application (and/or the audio output using the applications may be mixed, such as by audio mixing to combine sounds from the applications). The output streams may be mixed in a manner that does not affect an ability of a speaker to output audio content associated with the audio player application. Some implementations enable communication from the first mobile device to the second mobile device even if either of the mobile devices enters a background state. In this way, performance of an application and/or client device that relies or involves continuous short range wireless communication scanning can be improved, thereby, reducing consumption of computing resources (e.g., processing resources, memory resources, power resources, and/or the like) and/or communication resources otherwise used to attempt to continue to short range wireless communication scanning after an application is in a background state (or has been suspended by an operating system).

Furthermore, some implementations described herein, permit continuous short range wireless communication scanning without requiring an update or alteration to the operating system. For example, because the operating system is configured to permit applications to continue to run, when in a background state, while controlling an output component, the operating system may be prevented from suspending one or more operations of the application, thereby, permitting the application to continue short range wireless communication scanning. In this way, computing resources that might otherwise be used to design and/or update an operating system to enable an application and/or client device to continuously perform short range wireless communication scanning, can otherwise be conserved.

FIGS. 1A-1D are diagrams of an example 100 associated with continuous short range wireless communication detection for user devices using a background application. As shown in FIGS. 1A-1D, example 100 includes a first device (shown as "Device 1") and a second device (shown as "Device 2"). The first device and the second device (referred to herein collectively as the "devices"), in example 100, are short range wireless communication devices (e.g., devices with BLUETOOTH® capability, BLE capability, and/or the like). In some implementations, the devices are a same type of device (e.g., both devices are smartphones (as shown in example 100), Internet of Things (IoT) devices, and/or the like) or different types of devices (e.g., the first device is a smart phone and the second device may be an IoT device).

In example 100, the first device includes an application module, an operating system, an output system, and a short range wireless communication component. The application module enables one or more applications to be installed, opened, and/or executed. The operating system is configured to monitor application sessions of applications of the application module to manage computing resources (e.g., processing resources, memory resources, power resources, and/or the like) of the first device. As described herein, the operating system may be a legacy operating system that does not have to be updated and/or reconfigured to enable continuous short range wireless communication detection of the first device, as described herein. The output system, as shown, includes a speaker (e.g., to emit sound associated with audio content) and a light emitter (e.g., a light emitting diode (LED), laser, and/or the like), and may include other output components of the first device (e.g., a display, a haptic output, and/or the like). The short range wireless communication component includes an antenna and/or other components that facilitate short range wireless communication (e.g., with the second device or other devices). The first user device may include various other components (e.g., input components, other output components, other communication components, and/or the like).

As described herein, the first device may be configured to enable continuous short range wireless communication detection using a continuous discovery mode of an application that utilizes short range wireless communication (shown as "Short Range Wireless Communication Application" in FIGS. 1A-1D and referred to herein as "the application"). The continuous discovery mode, in example 100, prevents the application from being suspended (e.g., by an operating system of the first device) when in a background state by causing the application to control an output component of the output system, thereby, enabling the application to continue to transmit an advertisement via the short range wireless communication component until the continuous discovery mode is suspended.

As shown in FIG. 1A, and by reference number 105, the application is installed and/or opened on the first device to initiate an application session. The application may be installed and/or opened to initiate an application session based on a user input associated with downloading the application, initiating an installation program of the first device, and/or opening the application (e.g., via a user interface of the first device). As described herein, during the application session, the application may be configured to detect and/or communicate with other devices (e.g., the second device) using the short range wireless communication component. For example, the application may be associated with obtaining information from the other devices, providing information to the other devices, detecting and/or recording that the first device is within range of the other devices, and/or the like.

As described herein, the application can be configured (e.g., in a continuous discovery mode) to provide an output stream to one or more output components of the output system to facilitate continuous short range wireless communication detection of the first device. Accordingly, once installed and/or opened, the application may permit the user device to be continuously discovered (e.g., while a continuous discovery mode of the application is activated).

As further shown in FIG. 1A, and by reference number 110, the application session is monitored by the operating system. While monitoring the application session (and other application sessions of other applications of the first device), the operating system in example implementation 100 is preconfigured (e.g., as a legacy operating system) to utilize an application state management protocol to control a state of the application and/or application session. The operating system may control the state of the application and/or operating system based on allocating certain types of resources (e.g., certain processing threads of the first device) for an application session of the application and/or based on enabling access to or control of certain components of the first device (e.g., the output components of the output system and/or the short range wireless communication component).

As shown in FIG. 1A, according to the application state management protocol, the application may be in various states (e.g., based on being controlled by the operating system). For example, the operating system may control the states of the application based on certain operating parameters of the first device. The operating parameters may include a runtime of the application (e.g., an overall length of time of an application session), an idle time of the application (e.g., a length of time between user interactions of the application session), a processing load of the first device (e.g., an amount of processing resources and/or memory resources in use), and/or the like. As described herein, the operating system is preconfigured to control the state of the application based on whether one or more of the operating parameters satisfy one or more thresholds of the operating parameters.

In example 100, the application may be in an unattached state 110-1, an initialized state 110-2, a foreground state 110-3, a standby state 110-4, a background state 110-5, and a suspended state 110-6. According to the application state management protocol, the application may be in unattached state 110-1 (relative to the first user device) prior to the application being installed on the first device or after the application is uninstalled from the first device. The application is in initialized state 110-2 after being launched (e.g., based on a user input). In initialized state 110-2, the application may be running (e.g., being executed by the first device) in association with initiating an application session. The application is in foreground state 110-3 after the application is opened and/or the application session is accessed (e.g., via a user input). In foreground state 110-3, the operating system permits the application to control a display of the first device to present a graphical user interface of the application to permit a user to interact with the application, via the graphical user interface, during the application session.

The application is in standby state 110-4 after the application session is no longer using the display of the first device. For example, the application may be moved to standby state 110-4 after the graphical user interface of the application has been closed or deactivated (e.g., based on a user input). Standby state 110-4 and/or initialized state 110-2 may involve the application running in a similar manner (e.g., relative to being associated with a most recent user interaction with the first device). The application is in background state 110-5 based on a background event occurring. For example, the background event may be an expiration of a threshold time period of the application being idle in standby state 110-4 (e.g., a default time period, a time period defined by a user setting, a time period that is specific to the application, and/or the like), a user input to move the application session to background state 110-5, another application being opened and/or utilizing the display of the first device, and/or the like.

The application is in suspended state 110-6 when the application session of the application is ended and/or deactivated. The operating system, of example 100, is preconfigured to suspend ongoing application sessions that are running in the background state 110-5 after a threshold time period. Accordingly, the operating system may move the application to suspended state 110-6 by deactivating the application after being inactive in background state 110-5 for the threshold time period. Additionally, or alternatively, the operating system may move the application to the suspended state 110-6 based on receiving a user input that ends the application session. As described herein, the application session may be inactive when the application session is not utilizing a main processing thread of the first device and/or when the application session is not utilizing one or more output components of the first device.

In this way, the operating system may be preconfigured to monitor the application and/or the application session to permit the first device to control the state of the application. As described herein, the first device (e.g., via the application and/or application session) is configured to activate continuous short range wireless communication detection without updating and/or altering the application state management protocol of the operating system (e.g., via an update or modification to the operating system), thereby permitting a first device with a legacy operating system to use continuous short range wireless communication detection.

Figure 1B:
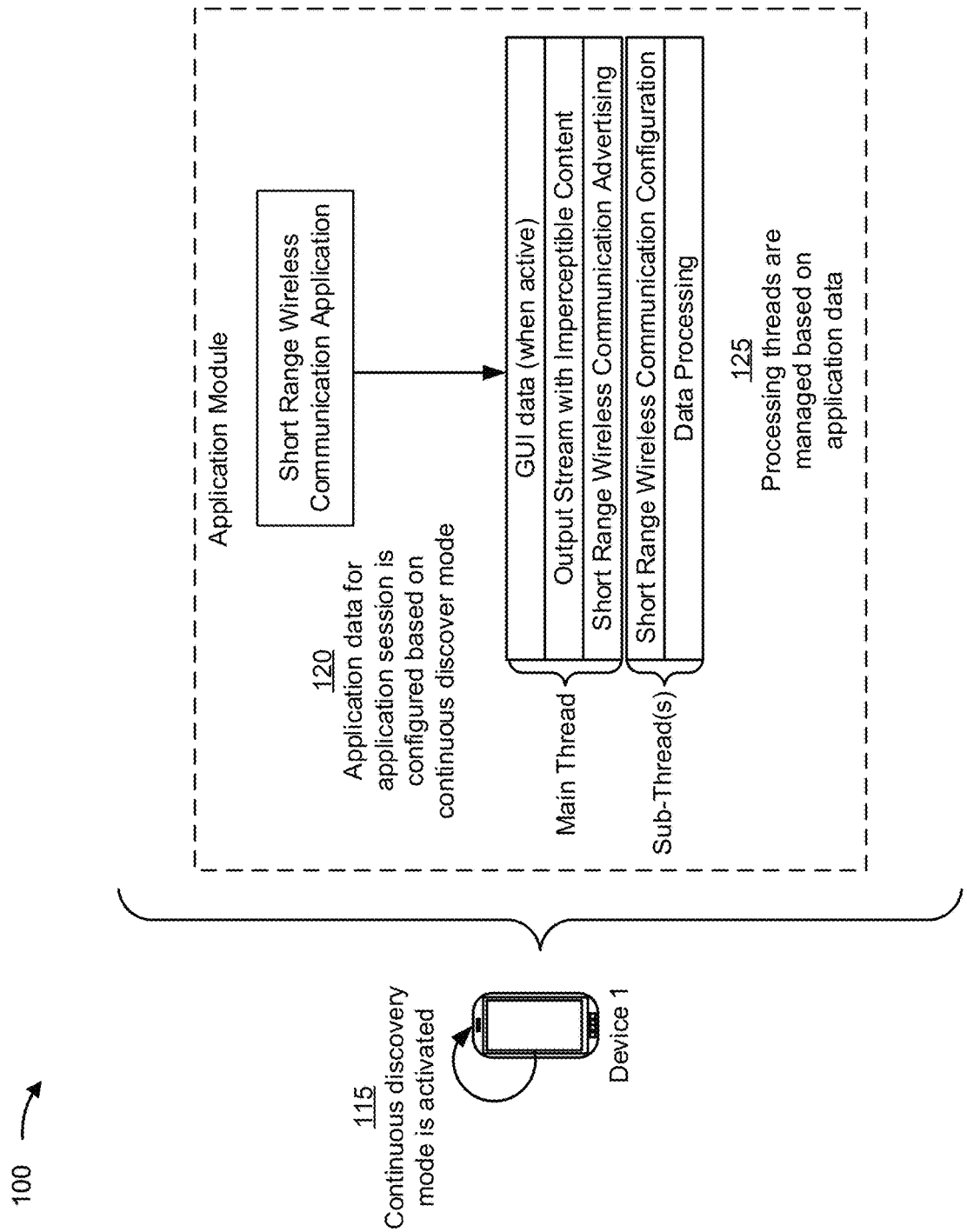

As shown in FIG. 1B, and by reference number 115, a continuous discovery mode is activated. The continuous discovery mode, as described herein, is configured to cause the short range wireless communication component to repeatedly transmit an advertisement that permits other devices (e.g., the second device) to detect the first device when the other devices are within a short range wireless communication range of the first device. Activation of the continuous discovery mode may be associated with the application and/or the application session. For example, the first device and or application module may activate the continuous discover mode based on receiving a user input associated with the application session (e.g., as an ad hoc user setting of the application), based on the application session being initiated (e.g., as a default mode of the application), based on the application session being active (e.g., as a fixed operating mode of the application), and/or the like.

In this way, a continuous discovery mode can be activated to permit the first device and/or the application session to continuously be detected via transmission of an advertisement (e.g., while the applications session is active).

As further shown in FIG. 1B, and by reference number 120, application data for the application session is configured based on the continuous discovery mode. For example, the application data may include graphical user interface data, an output stream, and an advertisement. The graphical user interface data may be any data used by the application session to display information associated with the application and/or receive user inputs for the application session.

The output stream may include a stream of data (e.g., audio data, light emitter activation data, and/or the like) that is provided to one or more output components to control the output components. As described herein, the output stream may be associated with imperceptible content (e.g., imperceptible audio content or imperceptible light content). Accordingly, when the continuous discovery mode is activated, the output stream can be obtained to cause the output component(s) to output imperceptible content and prevent the operating system from suspending the application session (e.g., because the operating system may consider the application to be active when using the output component), without degrading a user experience associated with outputting audible content or visual content.

An advertisement may be configured to include a device identifier associated with the device and/or a user identifier (e.g., name, username, identification number, and/or the like) associated with a user of the application. For example, the application may obtain the device identifier from the operating system or other system of the device. Additionally, or alternatively, the application may obtain the user identifier based on a user logging into the application and/or providing the user identifier along with other user information when registering an account associated with an application platform of the application. Accordingly, when the continuous discovery mode is activated, the advertisement may be configured to include the device identifier and/or the user identifier to permit other devices and/or users of the other devices to identify the device and/or the user.

In this way, the application data for the application can be configured for the application session to permit the application session to continue to run in a background (e.g., in background state 110-5) of the first device without getting suspended by the operating system after a threshold time period.

As further shown in FIG. 1B, and by reference number 125, processing threads are managed based on application data. For example, the application may indicate that certain types of the application data are to be processed via certain processing threads of the first device. Various processing threads of the first device may be designated with a certain priority with respect to being managed by the operating system. For example, the operating system may manage states of applications and/or application sessions based on which processing threads are being used by a particular application session. As shown, the first device may include a main processing thread (shown as and referred to herein as "main thread") and a sub processing thread (shown as and referred to herein as "sub thread"). The main thread is a processing thread that is associated with a relatively higher priority (e.g., given dedicated processing resources and/or memory resources) for processing data of application sessions, and the sub thread is associated with a lower priority (e.g., allocated resources that can be limited and/or removed based on usage or processing load of other processing threads, including the main thread).

As shown, the output stream may be processed via the main thread, as designated by the application and/or application module. Accordingly, the output stream is to be processed regardless of the state of the application while the application session is active (e.g., in the initialized state 110-2, in the foreground state 110-3, in the standby state 110-4, and/or in the background state 110-5). In some implementations, as described herein, if an application session is utilizing a main processing thread, the operating system is preconfigured to consider the application session as an active application. Accordingly, because the output stream is configured to utilize the main thread, the operating system may be prevented from suspending the application session (e.g., because the application session would not appear to be inactive to the operating system), even after a threshold time period of inactivity with respect to processing other data associated with the application session.

In some implementations, the output stream may be designated for operation in connection with the application session operating in the continuous discovery mode. Accordingly, if the application session is active, but the continuous discovery mode has not been activated, as described herein, the output stream may not be used to control the output component, via the main processing thread.

In this way, the processing threads of the first device can be managed to cause the output component to operate in association with the imperceptible content (e.g., to output silence and/or flickering light at an undetectable frequency) and/or prevent an operating system from suspending the application session while the application session is executing in a background state.

Figure 1C:
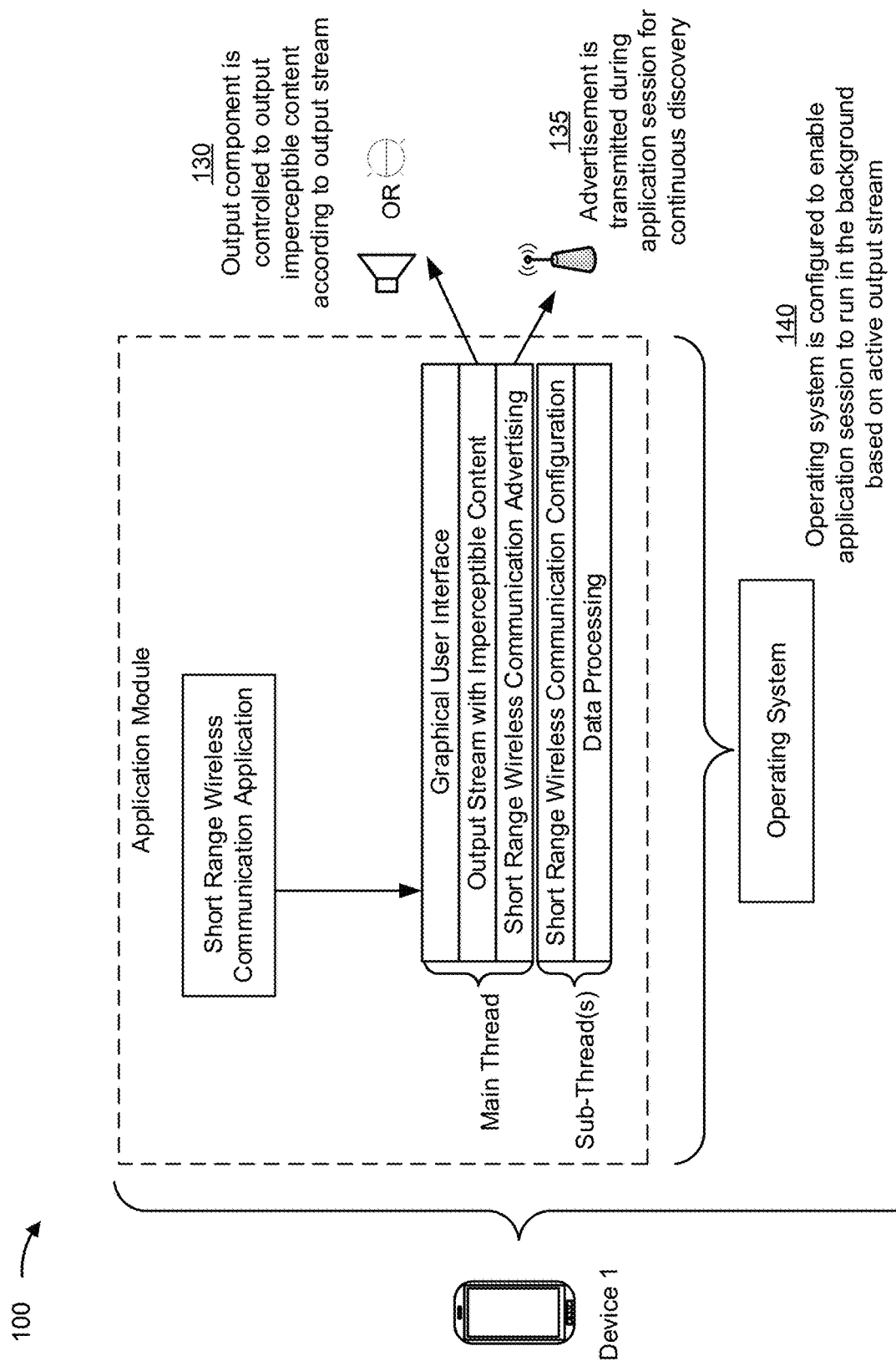

As shown in FIG. 1C, and by reference number 130, an output component is controlled to output imperceptible content according to the output stream. As described herein and shown, the output component may include a speaker (e.g., for media playback and/or alerts) or a light emitter (e.g., for use as a camera flash, flashlight, or other illumination device). In some implementations, the output stream may be associated with muted content that is to be output by a speaker. In such a case, the speaker may output silence or an audio signal that is in a frequency range that is inaudible to the human ear. Additionally, or alternatively, the output stream may be associated with light emitting content that is to be output by a light emitter. In such a case, the light emitter may output a light signal or light at a frequency (or flicker) that is undetectable to the human eye.

In this way, the first device and/or application may control the output component to output imperceptible content, and correspondingly prevent an operating system of the device from suspending the application session without degrading a user experience associated with outputting audible content or visual content.

As further shown in FIG. 1C, and by reference number 135, an advertisement is transmitted during the application for continuous discovery of the application and/or the first device. The advertisement may be repeatedly transmitted according any suitable short range wireless communication protocol. For example, the advertisement may be transmitted to broadcast the presence of the first device and/or detect the presence of other devices (e.g., devices that are within short range wireless communication range of the first device) using the short range wireless communication protocol.

As described herein, the advertisement may be repeatedly transmitted to indicate a device identifier associated with the first device that permits another device (e.g., the second device) that receives the advertisement to discover the first device. Additionally, or alternatively, the advertisement may be repeatedly transmitted to indicate a user identifier associated with a user that is associated with the application session to permit the other device (or a user of the other device) to identify the user.

According to some implementations, the advertisement is transmitted based on the application session being active (e.g., based on a user input to launch the application session and/or as a default setting of the application) and based on the continuous discovery mode being activated (e.g., based on a user input that is associated with the application session).

In this way, the first device is configured to repeatedly transmit the advertisement during the application session to enable continuous short range wireless communication detection of the first device.

As further shown in FIG. 1C, and by reference number 140, the operating system is configured to enable the application session to run in the background based on the output stream. For example, the operating system permits the application session to continuously run in the background (e.g., in the background state 110-5) based on the application session using the main thread to control the output component(s). Accordingly, because the application data was configured to use the main processing thread to control the output component, the operating system sees the application session as an active application session. Accordingly, using the main processing thread and/or controlling the output component via the output stream prevents the operating system from suspending the application and/or deactivating the application session.

In this way, the first device can be continuously detected via short range wireless communication because the advertisement is to be repeatedly transmitted while the application session is active and the operating system is prevented from suspending the application session (e.g., moving the application to suspended state 110-6) by considering the application session to be active.

Figure 1D:
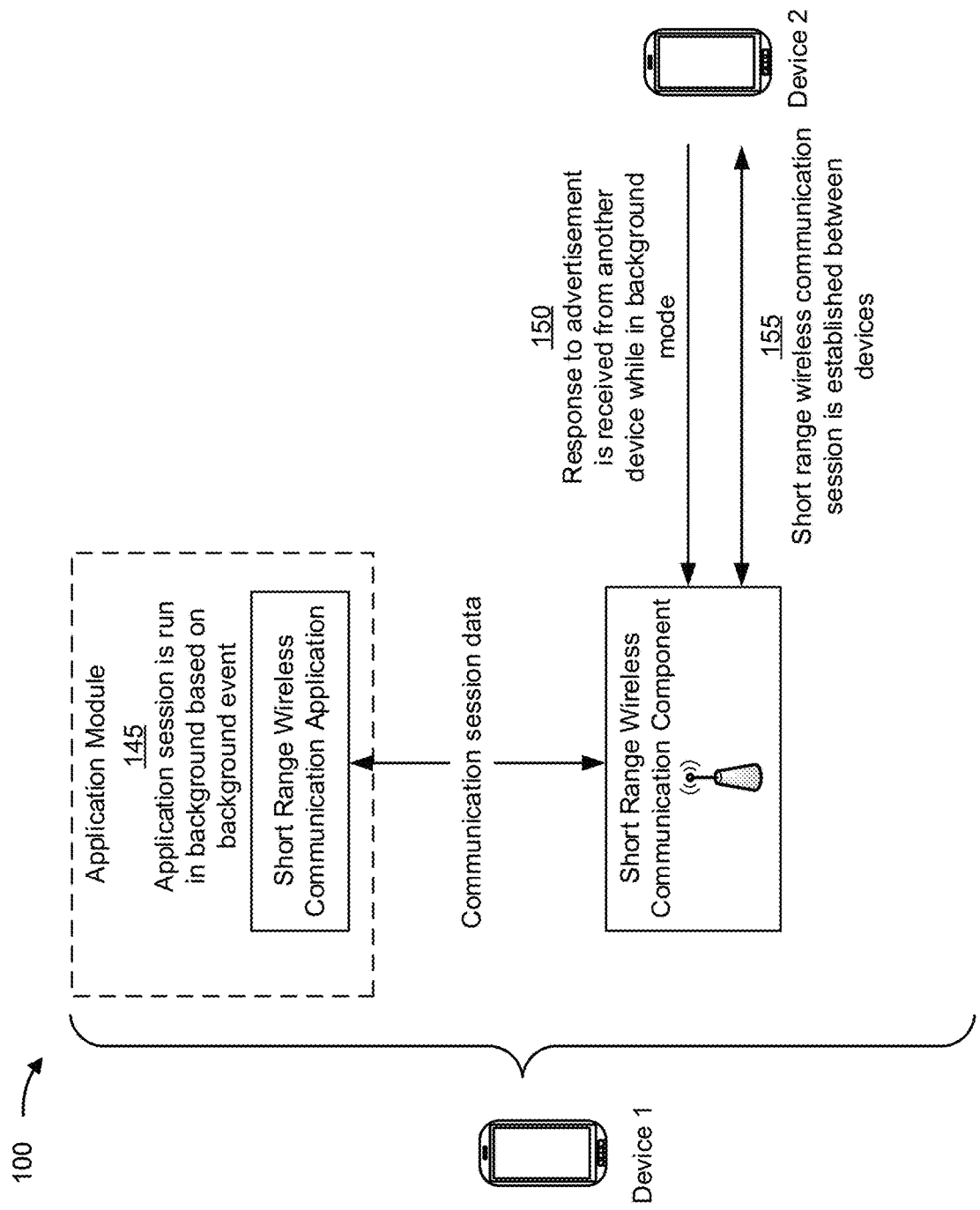

As shown in FIG. 1D, and by reference number 145, the application session is run in the background based on a background event. For example, the first device (e.g., via the operating system) may move the application the background state 110-5 based on detecting the background event. The background event may include an opening of another application, a deactivation of the graphical user interface of the application; an activation of a lock mode of the first device (e.g., to lock the first device), an activation of a standby mode of the first device (e.g., a low power mode to reduce power consumption of the first device), and/or the like.

As described herein, during the application session, the first device is to continue to transmit the advertisement via the short range wireless communication component. Accordingly, the first device may continue to transmit the advertisement via the short range wireless communication while the application session is running in the background. Furthermore, the application session may continue to run in the background of the first device beyond a threshold time period associated with the application session being inactive in the background, because the application session remains active while in the background based on using the main processing thread to process the output stream and/or based on controlling the output component.

In this way, the application session is run in the background of the first device to permit the first device to continue to transmit the advertisement while the application session is running the background in association with enabling continuous short range wireless communication detection.

As further shown in FIG. 1D, and by reference number 150, a response to the advertisement is received from the second device while the application session is running in the background. In some implementations, the response may be received after a threshold time period after the background event that is used by the operating system to suspend the application (e.g., because the application session remains active while running in the background). The first device, and/or the application, may process the response according to any suitable short range wireless communication protocol utilized by the first device and the second device.

According to some implementations, based on receiving the response, the first device may establish a short range wireless communication connection with the second device using the short range wireless communication protocol. In this way, based on receiving the response, the first device may establish a short range wireless communication session that is associated with the application session.

As further shown in FIG. 1D, and by reference number 155, a short range wireless communication session is established between the first device and the second device. The short range wireless communication session may be associated with the application session to permit the application and/or the first device to communicate with the second device. For example, the application may obtain information associated with the second device, such as device information, user information, application information and/or the like. In such a case, the short range wireless communication session may be utilized to record that the first device and the second device were within short range wireless communication range of each other (e.g., for location monitoring the first device, for contact tracing associated with users of the first device and the second device, and/or the like).

In some implementations, the application may be installed on the second device. In such cases, the application session on the first device may be merged with an application session on the second device in association with the short range wireless communication session. Accordingly, the short range wireless communication session, which may be configured via continuous short range wireless communication detection as described herein, can permit the applications on the devices to exchange data (e.g., in association with a gaming session, a data sharing session, and/or the like.

In some implementations, the second device may be associated with protecting access to a secured environment (e.g., a secured area of a campus, an interior of a building, an interior of a vehicle, and/or the like). For example, the first device and/or application may be associated with enabling wireless entry or keyless entry to the secured environment via short range wireless communication with the second device. Accordingly, based on the second device detecting the advertisement from the first device (e.g., while the application session is in the background of the first device), the second device may enable a user carrying the first device to access the secured environment (e.g., by unlocking a lock or security mechanism of the secured environment).

In this way, a short range wireless communication session can be established in association with an application when the application is maintained in the background of the first device by the continuous discovery mode.

As indicated above, FIGS. 1A-1D are provided as an example. Other examples may differ from what is described with regard to FIGS. 1A-1D.

Figure 2:
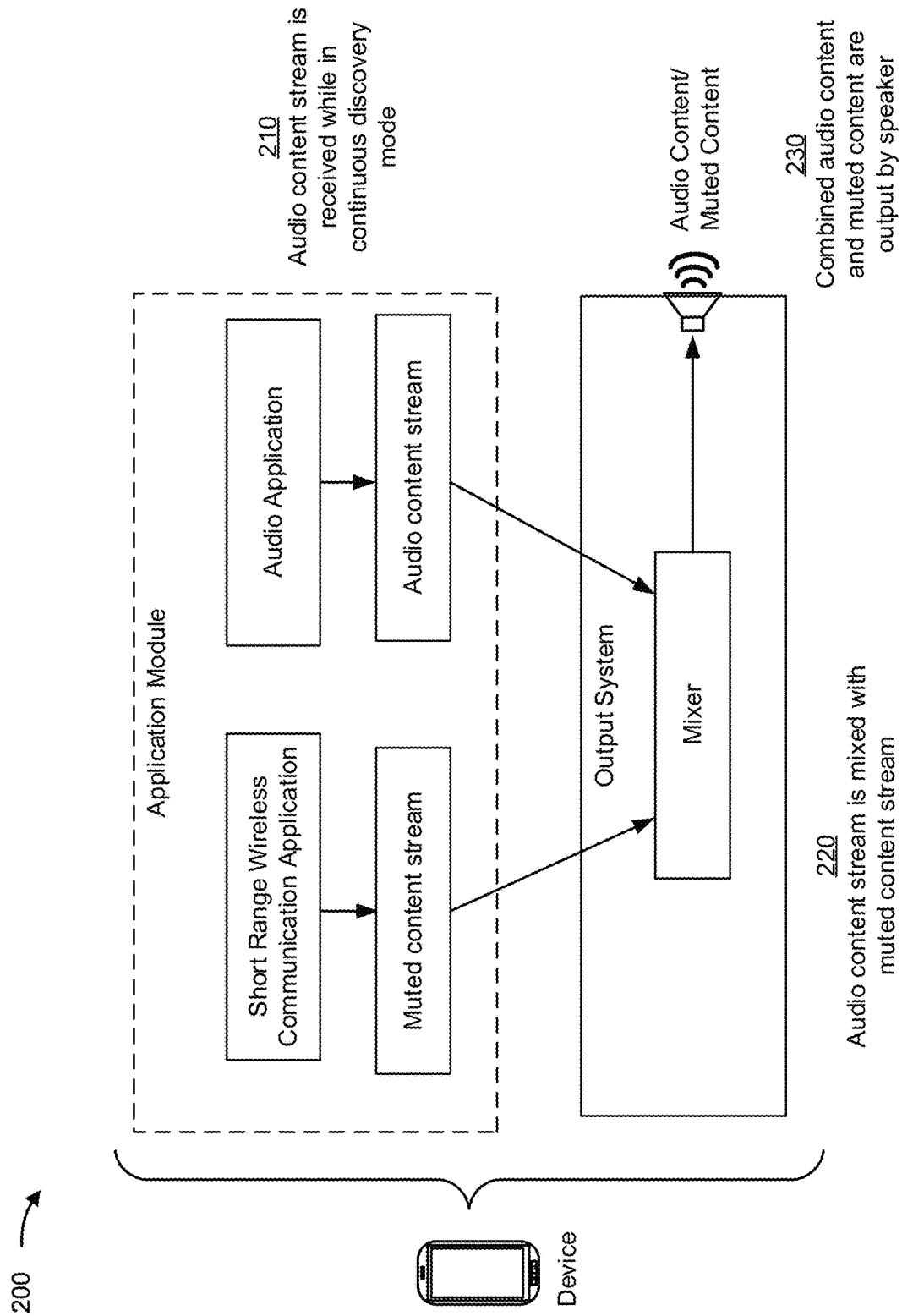
FIG. 2 is a diagram of an example implementation described herein.

FIG. 2 is a diagram of an example 200 associated with continuous short range wireless communication detection for user devices using a background application. As shown in FIG. 2, a device of example 200 includes an application module with a short range wireless communication application and an audio application and an output system with a mixer and a speaker. The short range wireless communication application may correspond to the application of example 100. In example 200, the device and/or the short range wireless communication application is configured to operate in continuous discovery mode, as described herein. Accordingly, the short range wireless communication application is providing a muted content stream to cause the speaker to output muted content (or silence). The audio application is an application that is configured to output audio content (e.g., associated with audio media data) via a speaker of the device.

As shown in FIG. 2, and by reference number 210, the audio content stream from the audio application is received while the short range wireless communication application is in the continuous discovery mode. The device and/or output system may determine that the speaker is to output audio content that is associated with the audio content stream.

As shown in FIG. 2, and by reference number 220, the audio content stream is mixed with the muted content stream. For example, the device and/or the output system, using a mixer, can combine the audio content stream and the muted content stream using any suitable technique that does not alter an output of the muted content or the audio content (e.g., so that the audio content is output as designed or configured). As an example, the mixer may generate a mixed stream that includes alternating muted content data from the muted content stream and audio content data from the audio content stream. Accordingly, the device and/or output system may enable the muted content stream to be combined with the audio content stream to form a mixed stream that, when provided to the output component, causes the output component to output muted content and audio content without disrupting the output of the audio content.

As shown in FIG. 2, and by reference number 230, the combined audio content and the muted content are output by the speaker. For example, the device and/or the output system may cause the speaker to output content according to the mixed stream to provide both the muted audio content and the audio content. In this way, the application session may continue to run in the background state, despite another application being opened and/or using the speaker, and without inhibiting playback of the audio content.

As indicated above, FIG. 2 is provided as an example. Other examples may differ from what is described with regard to FIG. 2.

Figure 3:
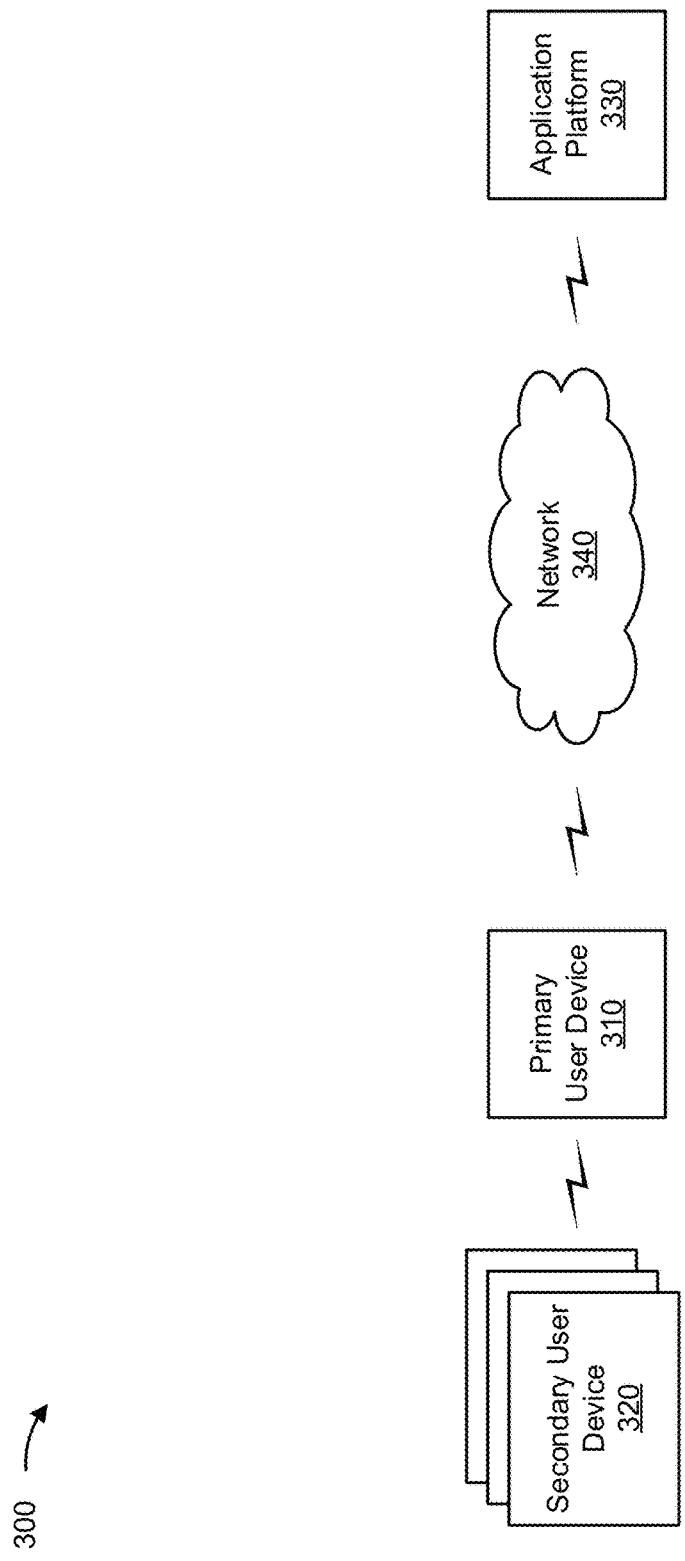
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a primary user device 310 (e.g., corresponding to the first device of example 100), one or more secondary user devices 320 (e.g., which may include the second device of example 100), an application platform 330, and a network 340. Devices of environment 300 may interconnect via wired connections, wireless connections, or a combination of wired and wireless connections.

The primary user device 310 includes one or more devices capable of receiving, generating, storing, processing, and/or providing information associated with enabling continuous short range wireless communication detection using a background application, as described elsewhere herein. The primary user device 310 may include a communication device. For example, the primary user device 310 may include a wireless communication device, a user equipment (UE), a mobile phone (e.g., a smart phone or a cell phone, among other examples), a laptop computer, a tablet computer, a handheld computer, a wearable communication device (e.g., a smart wristwatch or a pair of smart eyeglasses, among other examples), an IoT device, or a similar type of device. The primary user device 310 may communicate with one or more other devices of environment 300, as described elsewhere herein.

The secondary user device 320 may include any short range wireless communication device that is configured to detect short range wireless communication advertisements from primary user device 310 and/or response to the short range wireless communication advertisements from the primary user device 310, as described herein. Accordingly, the secondary user device 320 may include a similar type of device as the primary user device 310.

The application platform 330 includes one or more devices capable of receiving, generating, storing, processing, providing, and/or routing information associated with an application configured to facilitate continuous discovery of primary user device 310, as described elsewhere herein. For example, the application platform 330 may be associated with a backend system of an application that is configured to collect and/or monitor activity associated with short range wireless communications, short range wireless communication connections, and/or short range wireless communication devices, as described herein. The application platform 330 may include a communication device and/or a computing device. For example, the application platform 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The application platform 330 may communicate with one or more other devices of environment 300, as described elsewhere herein.

The network 340 includes one or more wired and/or wireless networks. For example, the network 340 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
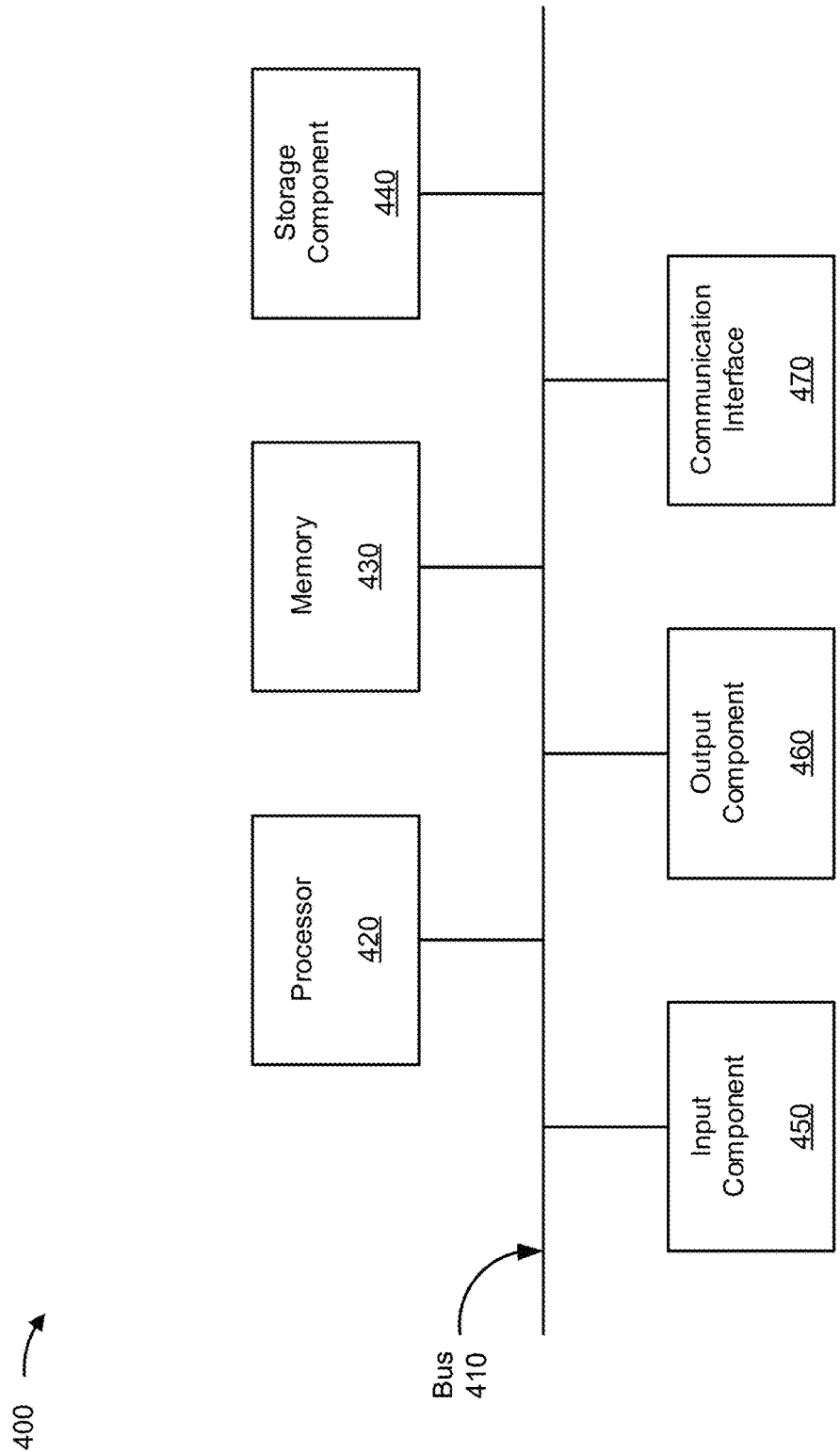
FIG. 4 is a diagram of example components of one or more devices of FIG. 3.

FIG. 4 is a diagram of example components of a device 400, which may correspond to the primary user device 310 and/or the secondary user device 320. In some implementations, the primary user device 310 and/or the secondary user device 320 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
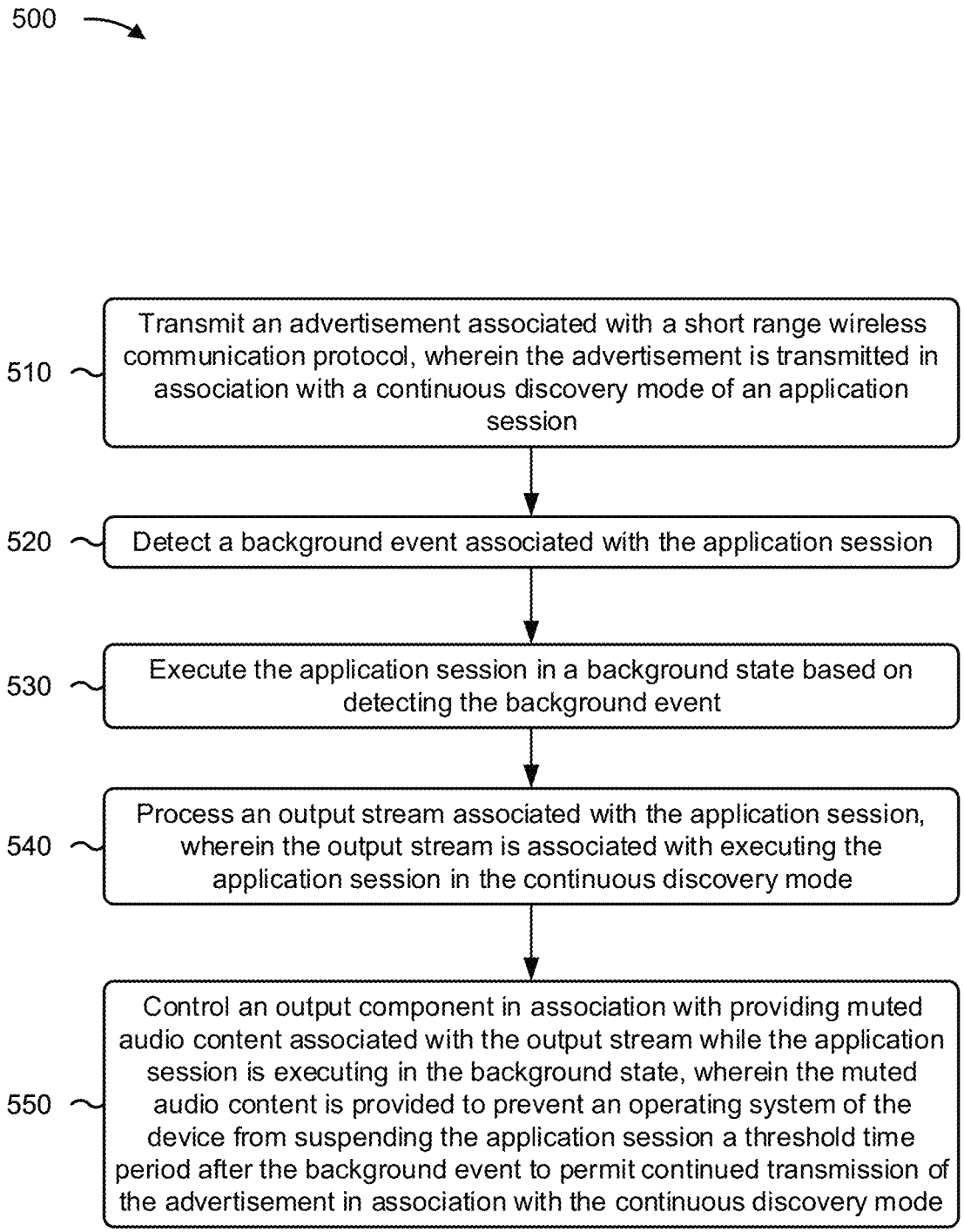
FIG. 5 is a flowchart of an example process relating to continuous short range wireless communication detection for mobile devices using a background application.

FIG. 5 is a flowchart of an example process 500 associated with continuous short range wireless communication detection for user devices using a background application. In some implementations, one or more process blocks of FIG. 5 may be performed by a user device (e.g., primary user device 310, secondary user device 320, and/or the like). Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include transmitting an advertisement associated with a short range wireless communication protocol, wherein the advertisement is transmitted in association with a continuous discovery mode of an application session (block 510). For example, the user device may transmit an advertisement associated with a short range wireless communication protocol, as described above. In some implementations, the advertisement is transmitted in association with a continuous discovery mode of an application session.

As further shown in FIG. 5, process 500 may include detecting a background event associated with the application session (block 520). For example, the user device may detect a background event associated with the application session, as described above.

As further shown in FIG. 5, process 500 may include executing the application session in a background state based on detecting the background event (block 530). For example, the user device may execute the application session in a background state based on detecting the background event, as described above.

As further shown in FIG. 5, process 500 may include processing an output stream associated with the application session, wherein the output stream is associated with executing the application session in the continuous discovery mode (block 540). For example, the user device may process an output stream associated with the application session, as described above. In some implementations, the output stream is associated with executing the application session in the continuous discovery mode.

As further shown in FIG. 5, process 500 may include controlling an output component in association with providing muted audio content associated with the output stream while the application session is executing in the background state, wherein the muted audio content is provided to prevent an operating system of the device from suspending the application session a threshold time period after the background event to permit continued transmission of the advertisement in association with the continuous discovery mode (block 550). For example, the user device may control an output component in association with providing muted audio content associated with the output stream while the application session is executing in the background state, as described above. In some implementations, the muted audio content is provided to prevent an operating system of the device from suspending the application session a threshold time period after the background event to permit continued transmission of the advertisement in association with the continuous discovery mode.

Process 500 may include additional implementations, such as any single implementation or any combination of implementations described below and/or in connection with one or more other processes described elsewhere herein.

In a first implementation, the advertisement is transmitted based on receiving a first user input that is associated with initiating the application session and the continuous discovery mode is activated based on a second user input that is associated with the application session.

In a second implementation, alone or in combination with the first implementation, the advertisement includes at least one of: a device identifier associated with the device that permits another device that receives the advertisement to discover the device, or a user identifier associated with a user that is associated with the application session to permit the other device to identify the user.

In a third implementation, alone or in combination with one or more of the first and second implementations, the output stream is a first output stream and process 500 may include determining that the output component is to output audio content that is associated with a second output stream, mixing the first output stream and the second output stream to form a mixed stream, and controlling the output component to output the mixed stream to provide both the muted audio content and the audio content.

In a fourth implementation, alone or in combination with one or more of the first through third implementations, controlling the output component may include causing the operating system of the device to provide the output stream to the output component using a main processing thread, the operating system is prevented from suspending the application session in the background state based on the main processing thread being used to provide the output stream to the output component.

In a fifth implementation, alone or in combination with one or more of the first through fourth implementations, the operating system may be configured to: suspend application sessions that are running in the background state after the threshold time period unless the application sessions are using one or more output components of the device, and the output component is one of the one or more output components.

In a sixth implementation, alone or in combination with one or more of the first through fifth implementations, process 500 includes receiving, while the application session is executing in the background state, a response that is associated with the advertisement, wherein the response is being received from another device and via the short range wireless communication protocol; and establishing a short range wireless communication connection with the other device to enable a communication session between the device and the other device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, communicatively coupled to the one or more memories, configured to:
 initiate an application session associated with an application;
 activate a continuous discovery mode associated with permitting discovery of the device during the application session,
  wherein the continuous discovery mode is to cause a short range wireless communication component of the device to repeatedly transmit an advertisement;
 obtain, based on the continuous discovery mode being activated, an output stream associated with the application session;
 control an output component according to the output stream;
 detect a background event associated with executing the application session in a background state;
 execute, based on the background event, the application session in the background state; and
 prevent, based on controlling the output component according to the output stream, an operating system of the device from suspending the application session in the background state until the continuous discovery mode is deactivated.

2. The device of claim 1, wherein the application is initiated based on receiving a first user input and the continuous discovery mode is activated based on a second user input that is different from the first user input.

3. The device of claim 1, wherein the one or more processors, when activating the continuous discovery mode, are configured to:
configure the advertisement to include at least one of:
 a device identifier associated with the device, or
 a user identifier associated with a user of the application.

4. The device of claim 1, wherein at least one of:
the output stream is associated with muted audio content and the output component is a speaker of the device; or
the output stream is associated with light emitting content and the output component is a light emitter of the device.

5. The device of claim 1,
wherein the one or more processors, when controlling the output component according to the output stream, are configured to:
 cause the operating system of the device to provide the output stream to the output component using a main processing thread of the device, wherein the operating system is prevented from suspending the application session in the background state based on the main processing thread being used to provide the output stream to the output component.

6. The device of claim 1, wherein the background event comprises at least one of:
   an opening of another application;
   a deactivation of a graphical user interface of the application;
   a shutdown of a display of the device;
   an activation of a lock mode of the device; or
   an activation of a standby mode of the device.

7. The device of claim 1,
   wherein the one or more processors, when preventing the operating system of the device from suspending the application session in the background state, are configured to:
      cause the operating system to permit the application session to execute in the background state after a threshold time period from detecting the background event,
         wherein the operating system is preconfigured to suspend ongoing application sessions that are running in the background state of the device after the threshold time period.

8. A method, comprising:
   transmitting, by a device, an advertisement associated with a short range wireless communication protocol,
      wherein the advertisement is transmitted in association with a continuous discovery mode of an application session;
   detecting, by the device, a background event associated with the application session;
   executing, by the device, the application session in a background state based on detecting the background event;
   processing, by the device, an output stream associated with the application session,
      wherein the output stream is associated with executing the application session in the continuous discovery mode; and
   controlling, by the device, an output component in association with providing muted audio content associated with the output stream while the application session is executing in the background state,
      wherein the muted audio content is provided to prevent an operating system of the device from suspending the application session a threshold time period after the background event to permit continued transmission of the advertisement in association with the continuous discovery mode.

9. The method of claim 8, wherein the advertisement is transmitted based on receiving a first user input that is associated with initiating the application session and the continuous discovery mode is activated based on a second user input that is associated with the application session.

10. The method of claim 8, wherein the advertisement includes at least one of:
    a device identifier associated with the device that permits another device that receives the advertisement to discover the device, or
    a user identifier associated with a user that is associated with the application session to permit the other device to identify the user.

11. The method of claim 8, wherein the output stream is a first output stream,
    wherein the method further comprises:
       determining that the output component is to output audio content that is associated with a second output stream,
          wherein the second output stream is associated with an audio application session that is executing on the device;
       mixing the first output stream and the second output stream to form a mixed stream; and
       controlling the output component to output the mixed stream to provide both the muted audio content and the audio content.

12. The method of claim 8, wherein controlling the output component comprises:
    causing the operating system of the device to provide the output stream to the output component using a main processing thread,
       wherein the operating system is prevented from suspending the application session in the background state based on the main processing thread being used to provide the output stream to the output component.

13. The method of claim 8, wherein the operating system is configured to:
    suspend application sessions that are running in the background state after the threshold time period unless the application sessions are using one or more output components of the device,
    wherein the output component is one of the one or more output components.

14. The method of claim 8, further comprising:
    receiving, while the application session is executing in the background state, a response that is associated with the advertisement,
       wherein the response is received from another device and via the short range wireless communication protocol; and
    establishing a short range wireless communication connection with the other device to enable a communication session between the device and the other device.

15. A non-transitory computer-readable medium storing instructions, the instructions comprising:
    one or more instructions that, when executed by one or more processors, cause the one or more processors to:
       receive, an output stream associated with an application session,
          wherein the output stream is associated with imperceptible content via an output component;
       transmit, via a short range wireless communication component, an advertisement associated with the application session; and
       configure a main processing thread that is associated with executing the application session to provide the output stream to the output component,
          wherein the main processing thread is configured to provide the output stream to:
             cause the output component to operate in association with the imperceptible content, and
             prevent an operating system from suspending the application session while the application session is executing in a background state.

16. The non-transitory computer-readable medium of claim 15, wherein the output stream is received based on a continuous discovery mode being activated to cause the advertisement to be repeatedly transmitted during the application session.

17. The non-transitory computer-readable medium of claim 15, wherein the imperceptible content is muted audio content and the output component comprises a speaker.

18. The non-transitory computer-readable medium of claim 17, wherein the application session is a first application session and the output stream is a first output stream,
 wherein the one or more instructions, when executed by the one or more processors, further cause the one or more processors to:
  determine that the output component is to provide audio content that is associated with a second output stream,
   wherein the second output stream is associated with a second application session that is executing; and
 enable the first output stream to be combined with the second output stream to form a mixed stream that, when provided to the output component, causes the output component to output the imperceptible content and the audio content.

19. The non-transitory computer-readable medium of claim 15, wherein the imperceptible content is light emission content and the output component comprises a light emitter.

20. The non-transitory computer-readable medium of claim 15, wherein the short range wireless communication component comprises a BLUETOOTH® Low-Energy (BLE) component.

\* \* \* \* \*